United States Patent [19]

Weaver

[11] Patent Number: 4,696,909
[45] Date of Patent: Sep. 29, 1987

[54] PLATINUM CORROSION REDUCING PREMELTED OXIDE COMPOSITIONS FOR LEAD CONTAINING SOLDER GLASSES

[75] Inventor: Edward A. Weaver, Toledo, Ohio

[73] Assignee: Owens-Illinois Television Products Inc., Toledo, Ohio

[21] Appl. No.: 848,551

[22] Filed: Apr. 7, 1986

[51] Int. Cl.$^4$ .......................... C03C 3/072; C03C 8/24
[52] U.S. Cl. .......................................... 501/75; 501/76; 501/27; 501/15; 501/17; 501/22
[58] Field of Search ................... 501/75, 76, 27, 15, 501/17, 22

[56] References Cited

U.S. PATENT DOCUMENTS

| 108,598 | 9/1937 | Gallup | 501/75 |
|---|---|---|---|
| 2,033,103 | 3/1932 | Beyersdorfer | 501/27 |
| 2,511,228 | 6/1950 | Sun et al. | 501/75 |
| 3,942,993 | 3/1976 | La Grouw et al. | 501/76 |
| 3,947,279 | 3/1976 | Hudecek | 501/2 |
| 3,973,975 | 8/1976 | Francel et al. | 501/15 |
| 4,522,925 | 11/1985 | Pirooz | 501/22 |

FOREIGN PATENT DOCUMENTS

| 1920883 | 4/1969 | Fed. Rep. of Germany | 501/75 |
|---|---|---|---|
| 3509955 | 9/1985 | Fed. Rep. of Germany | 501/76 |
| 7612047 | 5/1977 | Netherlands | 501/75 |

Primary Examiner—William R. Dixon, Jr.
Assistant Examiner—A. Knab
Attorney, Agent, or Firm—Howard G. Bruss

[57] ABSTRACT

Platinum corrosion reducing amounts of a premelted oxide mixture that is PbO and $B_2O_3$, or PbO and $SiO_2$, or PbO, $SiO_2$ and $B_2O_3$ are added to raw batch ingredients for a lead-containing solder glass. All or part of the $Pb_3O_4$ or PbO normally used in the raw batch is replaced for advantages including reducing the amount of platinum corrosion in a platinum melter used to melt the raw batch to provide the glass.

4 Claims, 1 Drawing Figure

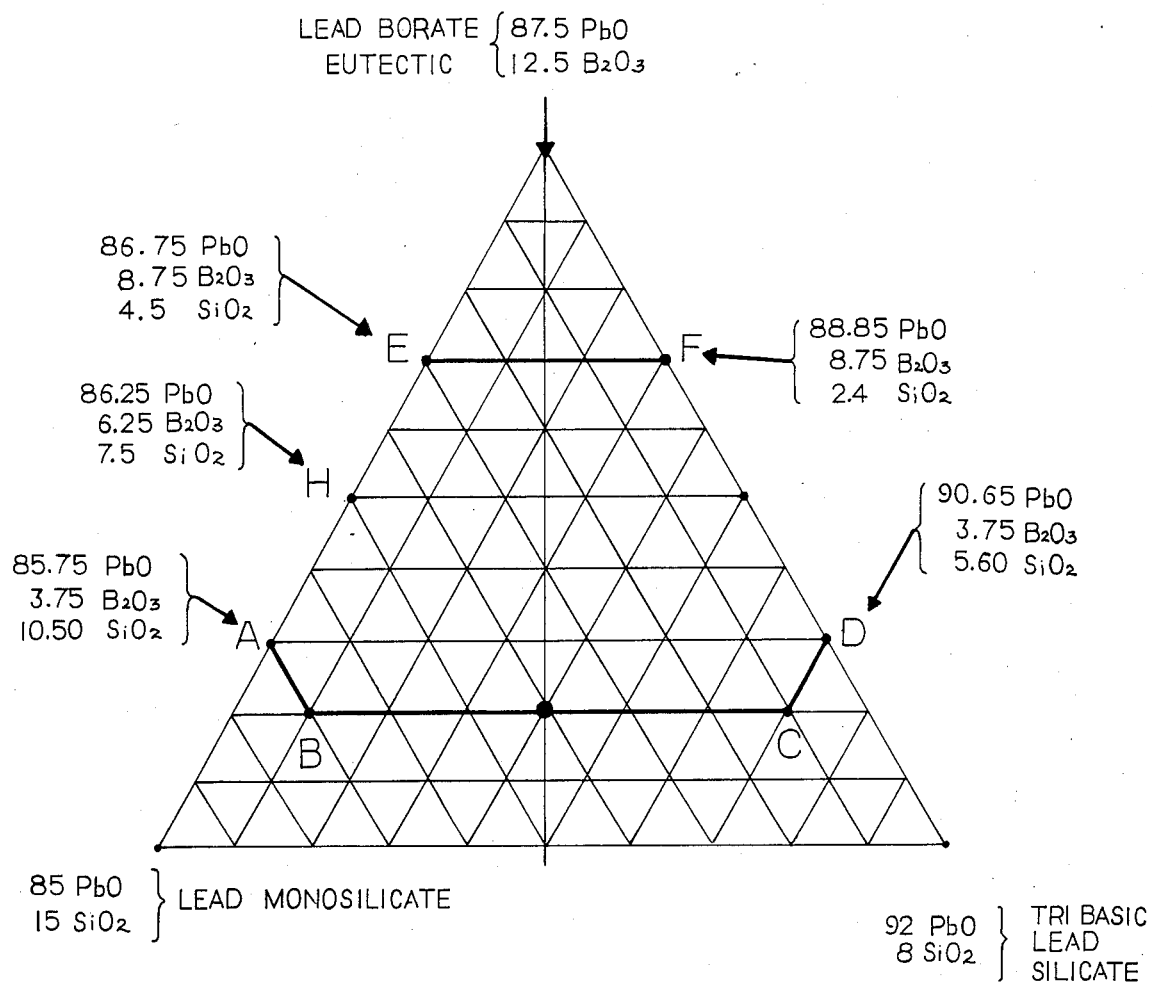

PLATINUM CORROSION REDUCING PREMELTED OXIDE COMPOSITIONS FOR LEAD CONTAINING SOLDER GLASSES

BACKGROUND OF THE INVENTION

The present invention relates to premelted oxide composition such as a premelted oxide mixture of PbO and $B_2O_3$ used as a major material in the raw bath for making lead containing solder glasses, resulting in batch mixtures that are $Pb_3O_4$ free or have reduced $Pb_3O_4$ content.

It is desirable that the use of $Pb_3O_4$ or PbO oxides in solder glass raw batch materials be reduced or eliminated, to thereby reduce any possible health hazard as well as to reduce costs and to take advantage of the unexpected reduction in platinum corrosion and the increased life of a platinum melter resulting from use of premelted materials as batch constituents.

OBJECTS OF THE INVENTION

It is an object of the present invention to provide an improved solder glass that is $Pb_3O_4$ free or has a reduced $Pb_3O_4$ content in the raw batch by using a premelted oxide mixture such as PbO and $B_2O_3$, or PbO and $SiO_2$, or a mixture thereof; so the glass can be made from raw batch ingredients without using $Pb_3O_4$ or PbO in oxide form.

It is an object of the present invention to provide an improvement in a lead containing solder glass containing PbO and/or $B_2O_3$ and $SiO_2$, the raw batch materials including an effective platinum corrosion reducing amount of a premelted oxide mixture of PbO and at least one of the oxides $B_2O_3$ and $SiO_2$.

It is an object of the present invention to provide a method of making a solder glass that is $Pb_3O_4$ free or has a reduced $Pb_3O_4$ content in the raw batch, the glass composition containing PbO and containing at least one of the oxides $SiO_2$ and $B_2O_3$, the composition optionally containing one or more of the oxides ZnO, BaO, $Al_2O_3$ and $Bi_2O_3$, the improved method comprising the steps of (A) providing raw batch ingredients to provide the above solder glass compositions; and (B) premixing as a major portion of the raw batch ingredients a premelted oxide mixture of PbO and $B_2O_3$ or a premelted mixture of PbO and $SiO_2$, or a mixture thereof, the premelted oxide composition being above the line ABCD of the ternary diagram of the Figure, the premelted oxide mixture being used in an effective platinum corrosion reducing amount.

These and other objects will be apparent from the description that follows, the appended claims, and the drawings, in which:

The FIGURE is a pseudo-ternary phase diagram of the premelted oxide mixtures including PbO and/or $B_2O_3$ and $SiO_2$ and mixtures thereof.

SUMMARY OF THE INVENTION

The present invention provides a raw batch for making a lead glass composition containing PbO and containing at least one of the oxides $SiO_2$ and $B_2O_3$, the composition optionally containing ZnO, BaO, $Al_2O_3$ and $Bi_2O_3$, the improvement comprising using as a major constituent of the batch an effective platinum corrosion reducing amount of a premelted oxide mixture of PbO and $B_2O_3$ or a premelted oxide mixture of PbO and $SiO_2$ or a mixture of both the premelted mixtures, the premelted oxide composition being above the line ABCD of the pseudo-ternary phase diagram of lead borate solder glass premelted oxide mixtures shown in the FIGURE.

The present invention also provides a method of making a solder glass composition that is $Pb_3O_4$ free or has a reduced $Pb_3O_4$ content in the raw batch, the glass containing PbO and containing at least one of the oxides $SiO_2$ and $B_2O_3$, the composition optionally containing one or more of the oxides ZnO, BaO, $Al_2O_3$ and $Bi_2O_3$, the method comprising the steps of (A) providing raw batch ingredients to provide the above solder glass compositions; and (B) premixing with the raw batch ingredients an effective platinum corrosion reducing amount of a premelted oxide mixture of PbO and $B_2O_3$ or a premelted mixture of PbO and $SiO_2$, or a mixture thereof, the premelted oxide composition being above the line ABCD of the ternary diagram of the FIGURE.

Due to the extremely corrosive attack of these lead borate and lead-zinc-borate glasses on refractory, it is necessary to melt them in cold-bottom and cold-walled refractory melters, or in platinum or platinum-rhodium melter bushings or crucibles.

The inventive concept of using premelted ingredients dramatically lowers the rate of attack of platinum (during the melting process) if platinum group metals are used for melting. This can be measured by measuring platinum content of the melted glass. Using premelted ingredients, the platinum content ranges from about 4 or 5 to 15 parts per million, compared to 20 to 35 parts per million for conventional oxide batch.

The present invention provides superior glass quality, the glass being made using a premelted oxide batch having less tendency to crystallize from internal or surface nucleation. This enables nucleating additives to be used in after-processes (such as grinding and blending) with more predictable results.

Use of premelted lead silicate such as 92% PbO.8-$SiO_2$ allows simpler and more complete melting and combination of the high-melting $SiO_2$ ingredient in these glasses.

The present invention provides unexpected results. The product made with premelted batch has superior DTA (differential thermal analysis) properties, which indicate it is less subject to random internal or surface nucleation, in which nucleation is a major problem in preparing these crystallizable solder lead containing glasses using conventional oxide batch materials.

The present invention provides an improvement preferably in a lead borate glass made in a platinum melter, the glass comprising the following ingredients in approximate weight percent:

| Ingredient | Wt. % |
| --- | --- |
| PbO | 65–85 |
| $B_2O_3$ | 5–15 |
| $SiO_2$ | 0–12 |
| ZnO | 0–15 |
| BaO | 0–4 |
| $Al_2O_3$ | 0–2 |
| $Bi_2O_3$ | 0–4 | the improvement comprising supplying all or part of the PbO, $B_2O_3$ and $SiO_2$ contents in a premelted mixture of oxides including a mixture of PbO and $B_2O_3$ and optionally a mixture of PbO and $SiO_2$ or a mixture of PbO, $B_2O_3$ and $SiO_2$, the balance of the oxides being supplied from raw batch material oxides or carbonates, the premelted mixture of oxides being used in a platinum corrosion reducing amount.

The present invention advantageously provides a lead containing solder glass made with a reduced amount of $Pb_3O_4$ or PbO or without using any $Pb_3O_4$ by using premelted oxides to reduce costs, health hazards and surprisingly reduce deterioration in platinum furnaces used to melt the raw batch materials. The invention unexpectedly substantially reduces the corrosion of platinum by the batch during melting and firing.

Generally, the premelted oxide (PbO and $B_2O_3$ or $SiO_2$ or mixtures of PbO, $B_2O_3$ and $SiO_2$) has a composition above the line ABCD in the pseudo-ternary diagram of the FIGURE and preferably a composition above the line EF in the diagram.

As seen in the FIGURE, the lefthand corner of the triangle forming the ternary diagram represents a composition of about 85 wt.% PbO and 15 wt.% $SiO_2$. The righthand corner represents about 92 wt.% PbO and 8 wt.% $SiO_2$. The apex represents a premelted oxide composition mixture of about 87.5% PbO and 12.5% $B_2O_3$. Good results have been obtained with a premelted oxide composition of about 86.25% PbO, 6.25% $B_2O_3$ and 7.5% $SiO_2$ seen at point H.

The points E and F have the premelted oxide composition of about 86.75 wt.% PbO, 8.75% $B_2O_3$, and 4.5% $SiO_2$ at point E and about 88.85 wt.% PbO, 8.75% $B_2O_3$ and 2.4% $SiO_2$ at F.

The point A has a premelted oxide composition of about 85.75% PbO, 3.75% $B_2O_3$ and 10.5% $SiO_2$ while the point D has a composition of about 90.65 wt.% PbO, 3.75% $B_2O_3$ and 5.6% $SiO_2$. As indicated in the diagram, the base line represents no $B_2O_3$ while the line BC represents approximately 2.5% $B_2O_3$. The top of the triangle of the diagram represents lead borate eutectic of a composition of about 87.5 wt.% PbO and .12.5% $B_2O_3$ with no $SiO_2$.

The premelted oxide has an average particle size of larger than 100 mesh or usually between 4 mesh and 30 mesh. The premelted oxide particles are much coarser than the red lead or $Pb_3O_4$ normal batch particle. This particle has an average size generally between 200 and about 325 mesh.

As known in the art, the other raw batch materials that supply the $B_2O_3$, $SiO_2$, etc., are well known such as boric acid, boric anhydride, silica sand, zinc oxide, aluminum oxide, bismuth oxide, and barium carbonate.

The more premelted oxide particles added to the conventional raw batch particles, the more the corrosion of the platinum from the platinum furnace is reduced. The corrosion of the platinum can be reduced from a normal amount of about 20 to 35 ppm using all $Pb_3O_4$, to as low as about 4 or 5 to 15 ppm by replacing most of the $Pb_3O_4$.

Lead containing glasses were made from raw batch materials including the premelted oxides, the mixing, melting and fining done conventionally.

All the $Pb_3O_4$ was replaced by the premelted oxide mixture(s) as follows:

| $Pb_3O_4$ FREE SOLDER GLASS BATCHES | | | | | |
|---|---|---|---|---|---|
| | GLASS | | | | |
| BATCH | PbO | $B_2O_3$ | $SiO_2$ | BaO | ZnO |
| 12 ZnO | | | | | 12 |
| 2.574 $BaCO_3$ | | | | 2 | |
| 68 (87.5 PbO - 12.5 $B_2O_3$) | 59.5 | 8.5 | | | |
| 10 (92 PbO - 8 $SiO_2$) | 9.2 | | 0.8 | | |
| 8 (85 PbO - 15 $SiO_2$) | 6.8 | | 1.2 | | |
| | 75.5 | 8.5 | 2.0 | 2 | 12 |
| 12.1 ZnO | | | | | 12.1 |
| 2.574 $BaCO_3$ | | | | 2 | |
| 66.8 (87.5 PbO - 12.5 $B_2O_3$) | 58.45 | 8.35 | | | |
| 10.5 (92 PbO - 8 $SiO_2$) | 9.66 | | 0.84 | | |
| 8.6 (85 PbO - 15 $SiO_2$) | 7.31 | | 1.29 | | |
| | 75.42 | 8.35 | 2.13 | 2 | 12.1 |
| 12.3 ZnO | | | | | 12.3 |
| 2.574 $BaCO_3$ | | | | 2 | |
| 66.8 (87.5 PbO - 12.5 $B_2O_3$) | 58.45 | 8.35 | | | |
| 10.0714 (92 PbO - 8 $SiO_2$) | 9.27 | | 0.81 | | |
| 8.8286 (85 PbO - 15 $SiO_2$) | 7.50 | | 1.32 | | |
| | 75.22 | 8.35 | 2.13 | 2 | 12.3 |

The $PbO-B_2O_3$ mixtures or the $PbO-SiO_2$ mixtures shown in parenthesis are the premelted oxide mixture compositions having an average particle size of about 4 to 30 mesh.

As noted in the examples, substantially all the $Pb_3O_4$ was eliminated from the raw batch and excellent results obtained. Benefits are obtained by replacing 25%, 50% or 75% of the $Pb_3O_4$. The more $Pb_3O_4$ replaced, the better the platinum corrosion reducing results.

The following table shows the range of premelted oxide mixtures and the range of oxides in the glass:

| RANGE OF PREMELTS |
|---|
| 20 L.B.E. to 100 L.B.E. (PbO, $B_2O_3$) |
| 0 L.M.S. to 80 L.M.S. (PbO, $SiO_2$) |
| 0 T.L.S. to 80 T.L.S. (PbO, $SiO_2$) |
| plus |

| | |
|---|---|
| 0-15 ZnO | 0-2 $Al_2O_3$ |
| 0-4 BaO | 0-4 $Bi_2O_3$ |
| 0-2 $SiO_2$ | |
| 0-2 $B_2O_3$ | |

| RANGE OF OXIDES | | |
|---|---|---|
| PbO | 65-85 | |
| $B_2O_3$ | 5-15 | from premelts |
| $SiO_2$ | 0-12 | (premelted oxide mixture) |
| ZnO | 0-15 | |
| BaO | 0-4 | |
| $Al_2O_3$ | 0-2 | from oxides or carbonates |
| $Bi_2O_3$ | 0-4 | |

In the table,
L.B.E. = 87.5 wt. % PbO - 12.5 wt. % $B_2O_3$
L.M.S. = 85 wt. % PbO - 15 wt. % $SiO_2$
T.L.S. = 92 wt. % PbO - 8 wt. % $SiO_2$ The raw batch materials are mixed and melted conventionally as known in the art. Lead containing glasses are shown, for example, in U.S. Pat. Nos. 3,947,279 (Carl J. Hudecek, assigned to Owens-Illinois, Inc.) and 3,973,975 (J. Francel, et al., assigned to Owens-Illinois, Inc.) which are incorporated by reference.

The premelted mixtures of PbO and $B_2O_3$, or PbO and $SiO_2$ are made by, for example, heating mixtures of litharge and silica, or litharge and boric acid, in a conventional cold-walled, surface heated refractory melter. The melted mixture is then water-fritted and dried to produce the premelted mixtures used as major constituents in the batch of the invention.

This step of preparing the premelted oxide mixtures of PbO and $B_2O_3$, or PbO and $SiO_2$, is much less critical than preparation of the final product melt of lead-zinc-borate crystallizable solder glass, or other lead compositions optionally containing ZnO, BaO, Al$_2$O$_3$, and Bi$_2$O$_3$.

The step of preparing premelted oxide mixtures of PbO and B$_2$O$_3$, or PbO and SiO$_2$, can employ lower cost raw materials such as litharge or boric acid, and can be done in a conventional non-platinum (refractory) furnace, because of the lower-melting eutectic nature of these mixtures, and their inherent non-crystallizing stability.

The following glass composition was made using premelted oxide mixtures and using regular raw batch materials:

| | |
|---|---|
| PbO | 75.42 wt. % |
| ZnO | 12.10 wt. % |
| B$_2$O$_3$ | 8.35 wt. % |
| SiO$_2$ | 2.13 wt. % |
| BaO | 2.00 wt. % |

Approximately 1000 pounds of the above glass was melted using lead borate (premelt) tribasic lead silicate and lead monosilicate all from Hammond Lead Co., and zinc oxide/barium carbonate regular raw materials. Only 16.6 percent of the batch was not premelted material.

This run, in a new platinum melter, was immediately followed by a 1000-lb. "control" run using regular non-premelted raw batch. Samples were collected each hour, lab ground and tested for properties and platinum content.

The results were as follows:
1. Platinum content of the glass was as follows:

| | PPM Platinum |
|---|---|
| (a) Regular Batch #1 | 29 |
| (b) Regular Batch #2 | 23 |
| (c) Premelted Batch #1 | 4.0 |
| (d) Premelted Batch #2 | 5.8 |

The above results show much lower platinum with the premelted batch.

2. Glass Properties of the premelted batch:

| DTA 440° C. | Rod Stress | Button Flow | Crystal Index |
|---|---|---|---|
| 21 min. | 440 psi G | 1.110 in. | 3.5 |

The glass had excellent properties for a solder glass.
What is claimed is:

1. A method of making in a platinum melter a Pb$_3$O$_4$ free solder glass composition containing PbO and containing at least one of the oxides SiO$_2$ and B$_2$O$_3$, the composition optionally containing one or more of the oxides ZnO, BaO, Al$_2$O$_3$ and Bi$_2$O$_3$, the method comprising the steps of
   (A) providing raw batch ingredients to provide the above solder glass compositions; and
   (B) premixing with the raw batch ingredients a premelted oxide composition mixture of PbO and B$_2$O$_3$ or a premelted mixture of PbO and SiO$_2$, or a mixture of PbO, B$_2$O$_3$ and SiO$_2$, or a mixture thereof, the premelted oxide composition mixture being above the line ABCD of the ternary diagram of the FIGURE, at least about 50% by weight of the Pb$_3$O$_4$ in the raw batch being replaced by the premelted oxide composition.

2. A method as defined in claim 1 in which there is mixed with the raw batch ingredients, a premelted oxide composition mixture that is above the line EF of the ternary diagram.

3. A method of making a lead borate raw batch glass composition comprising the following raw batch ingredients that furnish oxides for a glass made therefrom, in the following approximate weight percent:

| Ingredient | Wt. % |
|---|---|
| PbO | 65–85 |
| B$_2$O$_3$ | 5–15 |
| SiO$_2$ | 0–12 |
| ZnO | 0–15 |
| BaO | 0–4 |
| Al$_2$O$_3$ | 0–2 |
| Bi$_2$O$_3$ | 0–4 | the method including the step of mixing in the raw batch ingredients that provide the lead borate glass raw batch a premelted mixture of oxides including PbO and B$_2$O$_3$ and optionally PbO and SiO$_2$, the balance of the oxides being supplied from raw batch ingredients comprising oxides or carbonates, at least about 75% by weight of the Pb$_3$O$_4$ in the raw batch being replaced by the premelted oxide composition.

4. A method of reducing platinum corrosion in a platinum melter used to melt a lead-containing solder glass, the solder glass composition including PbO and SiO$_2$ or B$_2$O$_3$ or both, and optionally one or more oxides including BaO, Al$_2$O$_3$ and Bi$_2$O$_3$, the method including
   (a) providing raw batch ingredients (exclusive of Pb$_3$O$_4$ or oxide PbO) and mixing these ingredients with
   (b) an effective platinum corrosion reducing amount of a premelted oxide composition comprising PbO and SiO$_2$, or PbO and B$_2$O$_3$, of PbO, SiO$_2$ and B$_2$O$_3$, or mixtures thereof, the premelted oxide composition being above the line ABCD of the ternary diagram of the FIGURE, the premelted oxide composition replacing substantially all the Pb$_3$O$_4$ in the raw batch.

* * * * *